INVENTOR.
MARVIN W. WALTERS

INVENTOR.
MARVIN W. WALTERS

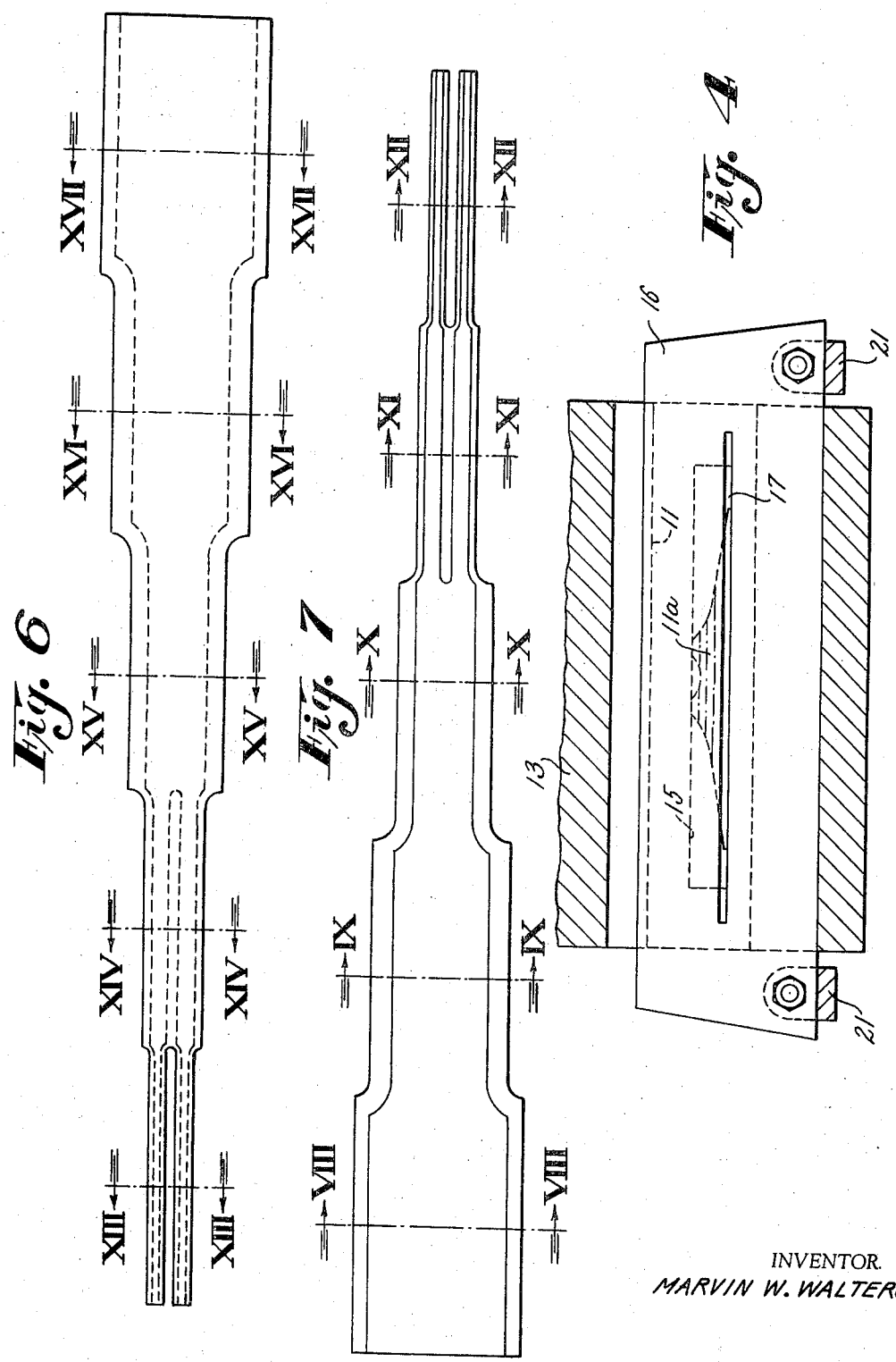

Fig. 8
Fig. 13
Fig. 9
Fig. 14
Fig. 10
Fig. 15
Fig. 11
Fig. 16
Fig. 12
Fig. 17
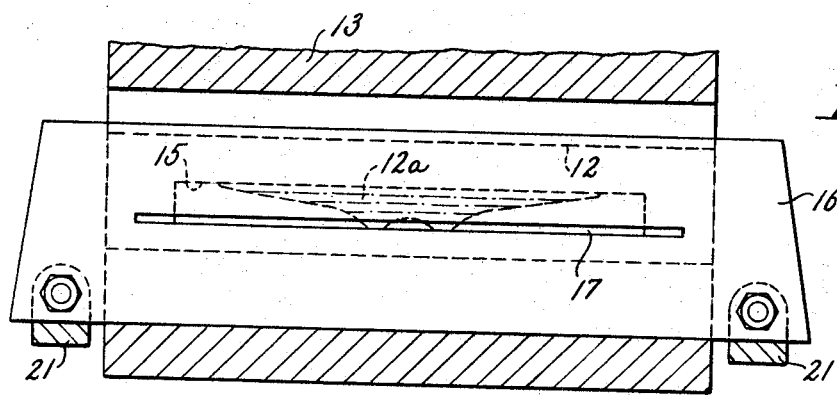
Fig. 5
INVENTOR.
MARVIN W. WALTERS Feb. 4, 1969 M. W. WALTERS 3,426,116
METHOD AND APPARATUS FOR EXTRUDING TIRE TREADS
Filed Dec. 8, 1967 Sheet 5 of 5
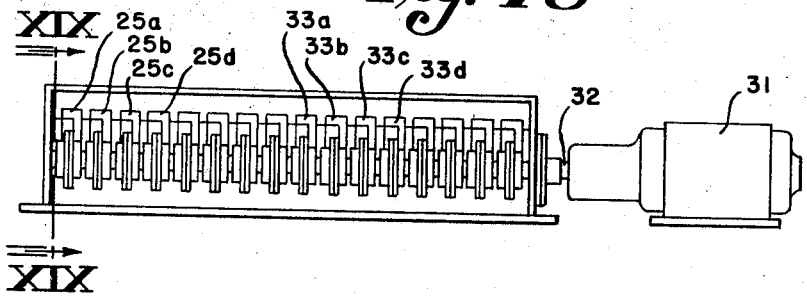
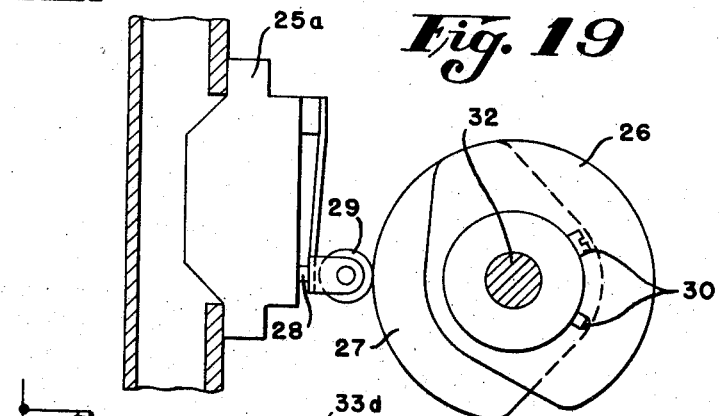
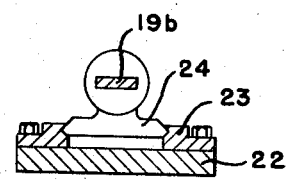
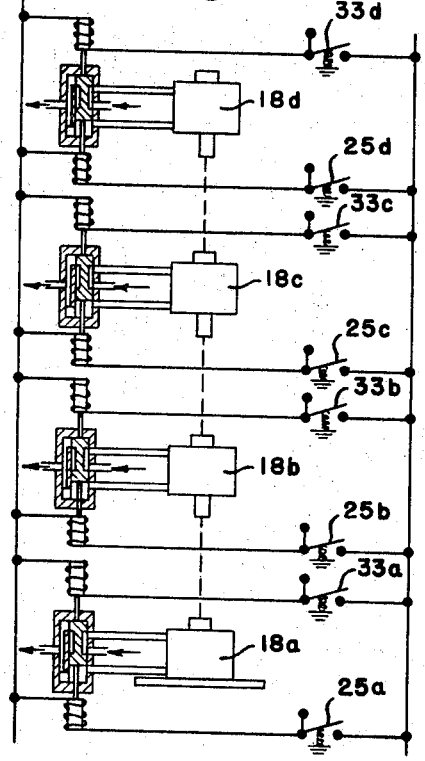
INVENTOR.
MARVIN W. WALTERS United States Patent Office 3,426,116
Patented Feb. 4, 1969

3,426,116
METHOD AND APPARATUS FOR EXTRUDING
TIRE TREADS
Marvin W. Walters, Grosse Pointe Woods, Mich., assignor to Uniroyal, Inc., New York, N.Y., a corporation of New Jersey
Continuation-in-part of application Ser. No. 336,492, Jan. 8, 1964. This application Dec. 8, 1967, Ser. No. 689,123
U.S. Cl. 264—167                    6 Claims
Int. Cl. B29h 17/36

ABSTRACT OF THE DISCLOSURE

Two sections of tread stock material are continuously extruded in varying widths so that they may be wound around tire carcasses to build up tread slabs of the proper thickness. Two tread dies having openings in the form of the tread cross-section are placed on opposite sides of an extruder head, the dies being inverted relative to each other. Vertically movable gates are provided to permit extrusion of material successively through opposed dissimilar sections of the dies, the full movement of the gates being effective to extrude the entire tread cross-sections.

---

This application is a continuation-in-part of the co-pending application of Marvin W. Walters, Ser. No. 336,492 filed Jan. 8, 1964 and now abandoned.

This invention relates to the extrusion of raw tire treads and, more particularly, to the extrusion of tire tread material in a manner to permit its being wrapped around the carcass continuously, thereby to build up a tread slab without the necessity of any skiving, splicing or cementing operations.

Tire treads are usually formed by extruding tread stock material directly in the cross-sectional shape desired. This, of course, necessitates skiving and splicing the tread after it has been wrapped around the tire carcass. Treads have also been built up by plying a number of strips of progressively narrower widths, but this has required a succession of such skives and splices, together with cementing operations. This has caused tread separations and blows due to poor adhesion between the thick co-acting layers.

Where endless tire tread material has been used (see, for example, U.S. Patents No. 2,849,049 and Re. 25,349), such has had to be in the form of a very thin strip or ribbon, necessitating very many winds, since it is not possible to extrude varying widths of material at a constant speed. This latter is true because the pressure in the extruder causes the smaller cross-sections of material to spurt out at a much higher rate than do the larger cross-sections.

It is, thus, an object of the present invention to provide a spliceless tire tread that can be continuously extruded in the varying widths required to build up a tread slab of the proper thickness.

It is a further object of the present invention to provide a method and apparatus for extruding such tire tread material at a constant speed.

It is a still further object of the present invention to provide a method and apparatus for extruding strips of tread stock material in progressively narrower widths and properly stepped back at their edges, so that when wrapped around a tire carcass a full section tread is obtained of the proper thickness and cross-sectional shape.

It is a still further object of the present invention to extrude such tread material continuously, thereby to permit either direct application of the material to the carcass on a building drum, lamination of such strips on a drum for use as a spun-on tread, or the storing of such strips for future use either on tray trucks or rolled up with liner separators for use as camelback for retreading purposes.

In accordance with the method of this invention, the raw tire tread material is extruded by positioning a pair of tread dies having openings in the form of the tread cross-section on opposite sides of the head of an extruder, the dies being inverted relative to each other. The openings in the tread dies are divided into a plurality of pairs of horizontal sections, and a length of elastomeric tread stock material equal approximately to the circumference of the tire is extruded successively through each of the horizontal sections, thereby to form a pair of continuous pieces of extruded material which can be wrapped, as around a tire carcass, to form a tire tread thereupon.

The apparatus of the invention comprises an extrusion head in a standard tuber or extruder, a pair of horizontally unsymmetric extrusion dies in the extrusion head, the dies having openings therein for extruding material therethrough, and being placed on opposite sides of the extrusion head, and being inverted relative to each other. Gate means are provided adapted to divide the openings in the dies into a plurality of pairs of equal horizontal sections. Such gate means are further adapted to permit extrusion of material through only one of the pairs of horizontal sections at a time. Means are also provided to move the gate means vertically, so as to permit extrusion of material successively through each of the pairs of horizontal sections. In this manner, a smooth flow of extruded material can be maintained without the necessity of altering the pressure in the extruder, as by varying the rotor speed.

The method and apparatus will be further understood by referring to the drawings, wherein:

FIG. 4 is a cross-sectional view taken on line IV—IV of FIG. 3;

FIG. 5 is a cross-sectional view taken on line V—V of FIG. 3;

FIG. 6 is a plan view of the piece of extruded material emanating from the die shown in FIG. 5;

FIG. 7 is a plan view of the piece of extruded material emanating from the die of FIG. 4;

FIG. 8 is an enlarge dcross-sectional view taken on line VIII—VIII of FIG. 7, showing the extruded material which results from the first position of the FIG. 4 die;

FIGS. 9, 10, 11 and 12 are enlarged cross-sectional views, similar to that of FIG. 8, taken at their respective designated locations on FIG. 7, and showing the cross-sectional results of the progressive positions of the FIG. 4 die;

FIGS. 13, 14, 15, 16 and 17 are enlarged cross-sectional views, taken at their respective designated locations on FIG. 6, and showing the cross-sectional results of the progressive positions of the FIG. 5 die;

FIG. 18 is a side elevational view of a control means.

FIG. 19 is an enlarged cross-sectional view taken on line XIX—XIX of FIG. 18, showing one of the adjustable switches of the control means;

FIG. 20 is an enlarged cross-sectional view taken on line XX—XX of FIG. 3, showing the mounting arrangement of one of the fluid cylinders to the extruder; and FIG. 21 is a schematic diagram of the relationship of the control means and the fluid cylinder.

Figure 1:
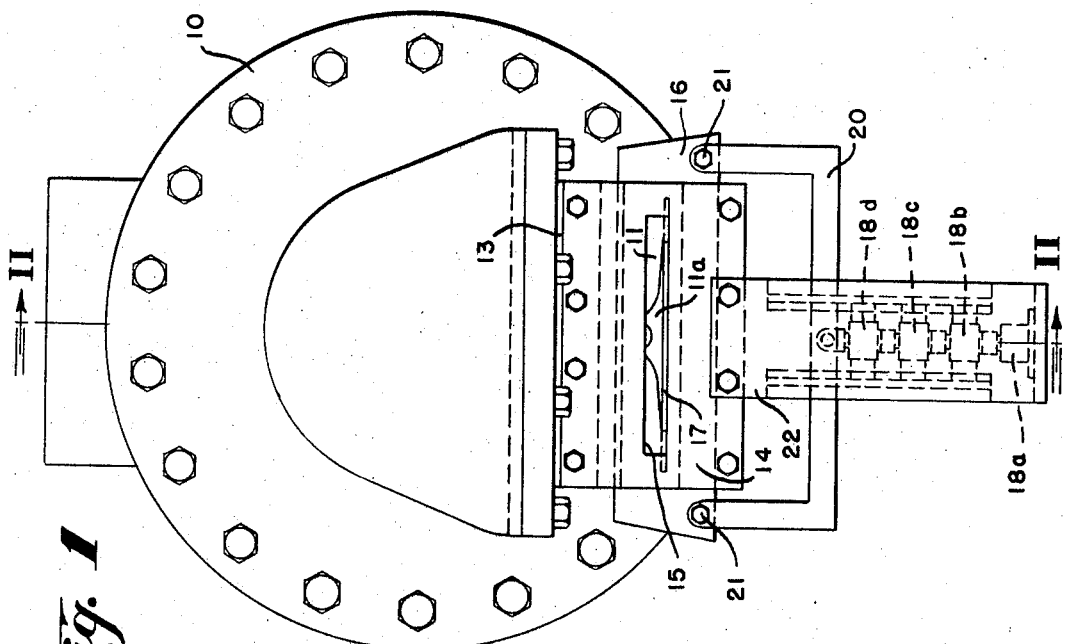
FIG. 1 is an elevational end view of a tread extruder.
Figure 3:
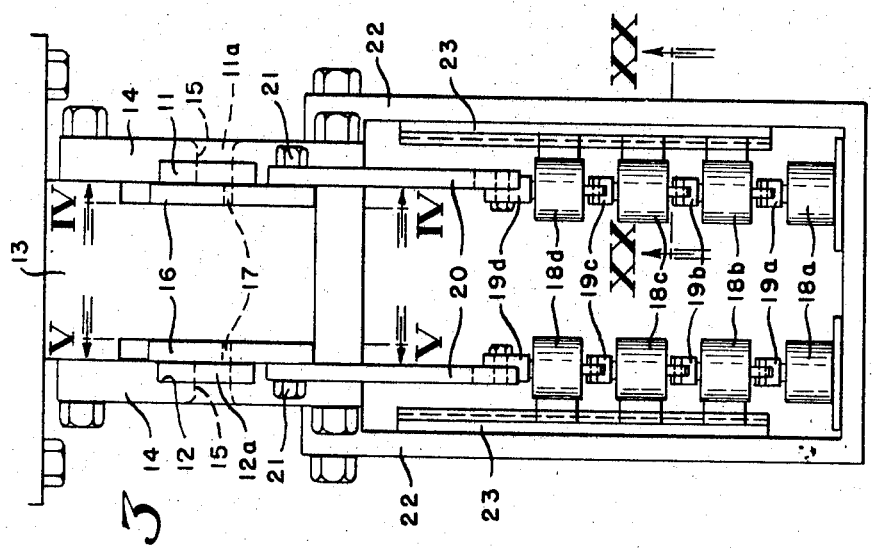
FIG. 3 is an enlarged side elevational view of the head or die end of the extruder.
Figure 2:
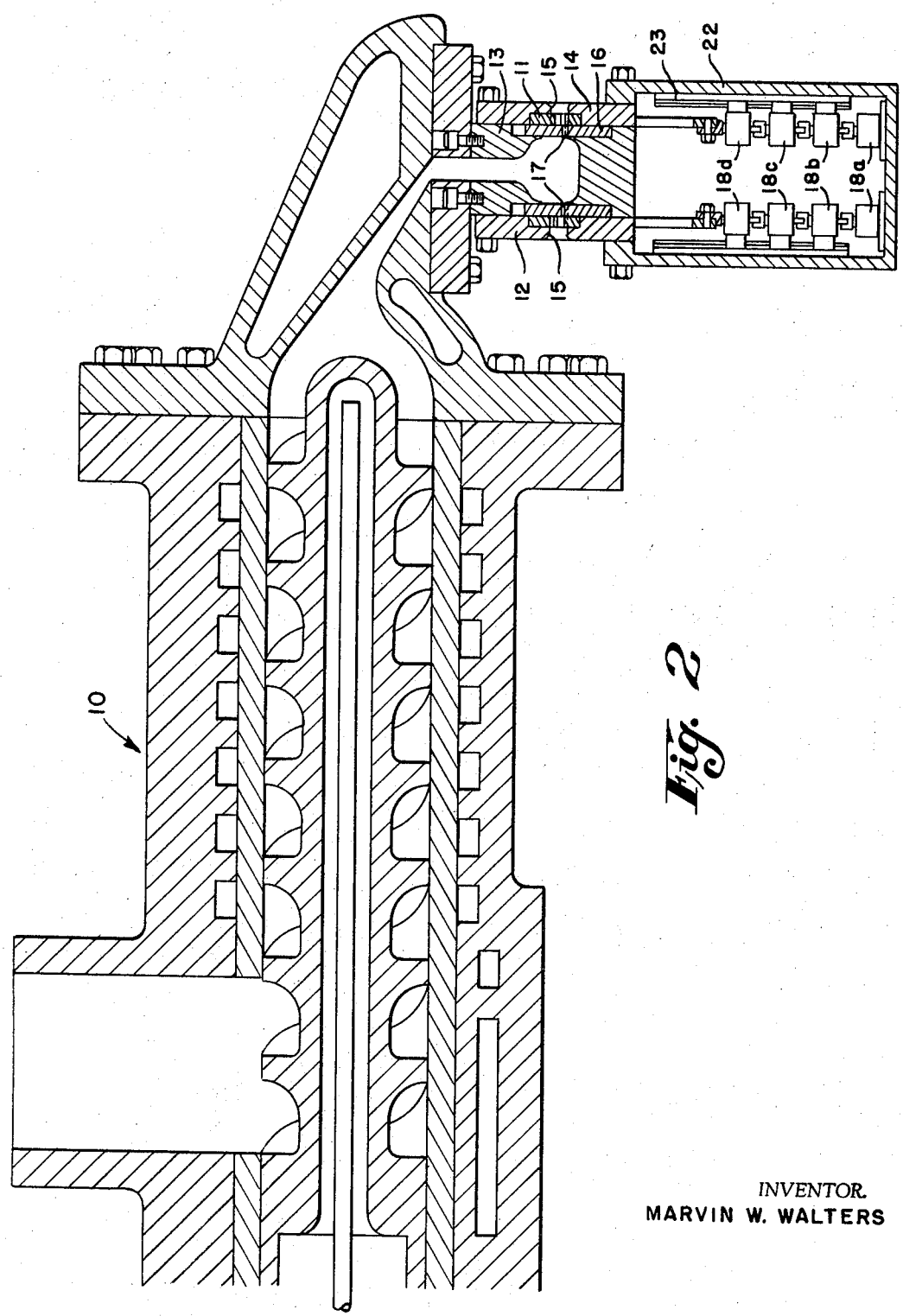
FIG. 2 is a longitudinal cross-sectional view taken on line 2—2 of FIG. 1.

Referring to the drawings and in particular to FIGS. 1–3, there is shown a conventional extruder or tuber 10, equipped with a pair of conventional tread dies 11 and 12. Tread dies 11 and 12 have openings 11a and 12a therein, which openings are identical to the ultimate form of treat cross-section desired. It will be noted that the openings 11a and 12a are horizontally unsymmetric, that is, they are symmetric about a vertical center line therethrough (see FIGS. 4 and 5), but they are not symmetric about any horizontal line therethrough.

Tread dies 11 and 12 are suitably clamped to the tuber head 13 by means of clamping plates 14. Clamping plates 14 have openings 15 therein to facilitate free passage of the extruded material therethrough.

A pair of gates 16 are provided, said gates being in slidable contact with the inner faces of dies 11 and 12. Each of the gates 16 having a horizontal opening 17 therein, said openings 17 being adapted to be placed in register with a horizontal section across each of dies 11 and 12. Thus, gates 16 are adapted to divide openings 11a and 12a in dies 11 and 12 into a plurality of pairs of equal horizontal sections, the gates 16 being further adapted to permit extrusion of tread material through only one pair of such horizontal sections at a time.

It will be noted that dies 11 and 12 are placed on opposite sides of tuber head 13 and are inverted relative to each other. Thus, the pairs of horizontal sections across openings 11a and 12a which are produced by gates 16 are taken from opposite vertical positions of the die openings. When the shapes of openings 11a and 12a are such that the total area of the pairs of horizontal sections remain approximately constant, it is possible to achieve a relatively constant flow of extruded material through tuber head 13. Thus, a smooth and relatively constant flow of extruded material can be maintained without the necessity of altering the pressure in the extruder, as by varying the speed of the rotor.

For purposes of the description herein, I have shown the vertical height of openings 17 in gates 16 as being equal to one-fifth of the height of die openings 11a and 12a, so that a total of four changes are necessary to extrude the five increments required to laminate a complete tire tread. Obviously, the same gate could be used with other dies having larger or smaller tread shape openings, but this would then require a different number of extrusion positions.

Gates 16 are moved vertically by means of two sets of fluid cylinder 18a–18d. Each cylinder has two operating positions, one with its piston rod extended and one with it retracted. Fluid cylinders 18a are fixedly connected to the supporting means 22 which is in turn bolted to the base of the tuber head 13. As can be seen in FIG. 20, each of the movable cylinders 18b–18d has a flange 24 which slidably fits in the tracks 23 which are in turn mounted on supporting means 22. Fluid cylinders 18b–18d are interconnected to each other and to fluid cylinders 18a by means of piston rods and linking means 19a–19c. Fluid cylinders 18d are connected to yokes 20 by means of piston rods and linking means 19d. The ends of yokes 20 are bolted to the extremities of gates 16 at their ends 21. Thus two separate sets of interconnecting fluid cylinders operate, when properly controlled, to position the gates 16 so as to permit extrusion of material successively through pairs of horizontal sections formed by the opening 17 in combination with dies 11 and 12.

The fluid cylinders can be controlled by various switching and control systems. A control system could be based on fixed time intervals or could be coordinated with the length of extruded thread. For example as seen in FIGS. 18, 19 and 21 the fluid cylinders can be controlled by a Gemco Rotating Cam Limit Switch. The control system would then consist of a motor 31 which drives a shaft 32 at a constant rate. Mounted on the shaft 32 are a series of pairs of cams 26 and 27 having an adjusting means 30 so that each cam 26 or 27 is rotatably adjustable in relation to the other cam and each pair of cams to all the other pairs of cams. Positioned close to the cams is a series of switch assemblies 25 and 33 each having a switch 28 whose position is controlled by one of the pairs of cams 26 and 27 through a cam follower 29. By adjustment of cams 26 and 27 the switch 28 can be activated at different times and for varying lengths of time. Each of the fluid cylinders 18 is controlled by a pair of switch assemblies 25 and 33 to raise and lower the gate 16 a given increment at the proper time in the extrusion process.

A complete cycle will now be described to illustrate the operation of the apparatus. At the beginning of any particular cycle, gates 16 are in their lowermost position. Openings 17 in gates 16 would, thus, coincide with the lowest horizontal section across each die opening. This is the position shown in FIGS. 4 and 5. Thus, while the largest amount of material is being extruded through the lowest horizontal section across opening 11a in die 11, the smallest amount of extrusion material is being extruded through the corresponding horizontal section across opening 12a in die 12. A length of elastomeric tread stock material is, thus, extruded through the lowermost of these pairs of horizontal sections, the length of elastomeric tred stock material being approximately equal to the circumference of the tire carcass. The extruded material generated is shown schematically at the left-hand side of FIGS. 6 and 7 (for cross-sectional views, see FIGS. 8 and 13).

After this first length of extruded material is formed, piston rods 19a are moved to their extended position by operation of cylinders 18a. The operation changes the position upwardly of the remaining cylinders and of the gates 16 so that the gates 16 are now in a position to extrude a length of materials as shown in FIGS. 6, 7, 9, and 14. Each cylinder is in turn activated, moving the remaining cylinders 18 and gates 16, until the five lengths of the continuous pieces have been extruded, as shown in FIGS. 6 and 7 (FIGS. 10–12 and 15–17). As will be readily understood, the extruded piece of material shown in FIG. 6 emanates from the die shown in FIG. 5; the extruded piece of material shown in FIG. 7 emanates from the die shown in FIG. 4.

In extruding the five lengths of the continuous pieces, it is not thought to be necessary to compensate for the increased circumference of the tire carcass caused by wrapping the first length or lengths therearound. This is due to the fact that the extruded tread material will stretch sufficiently to accommodate the deficiency, if any, and also because the tension on the material, caused by the pull of the apparatus onto which the tread material is to be wound, will inherently exert a greater force per unit of cross-sectional area on the tread material of smaller cross-sectional area than on that of the larger so that the former will necessarily be of greater length than the latter. Thus, if the gate is moved at equally spaced intervals of time, the lengths of the material extruded at each of the locations of the gate will be equal and should approximate the circumference of the tire carcass on which the tread is to be wound.

Since commercial operation will normally require a continuous production of tire tread material, after the lengths of extruded material have been extruded as shown in FIGS. 6 and 7, the subsequent sequence of movements of the gates would be downwardly. Thus, a double length of tread stock material would normally be extruded through the uppermost of the pairs of horizontal sections prior to moving gates 16 downwardly for the first time during the second sequence. Also, when gates 16 reach their lowermost position, a double length of material would normally be extruded again through the lowest of the pairs of horizontal sections. By this method, a continuous length of extruded material is produced that can be either cut to length for immediate use or rolled up for storage.

I have thus disclosed a method and apparatus for extruding raw tire tread material of constant thickness but of varying width and shape which can be wrapped around a tire carcass, thereby to form a predetermined tread slab without the necessity of any skiving, splicing or cementing. Open plies, tread separations in service and blows due to poor adhesion will all be eliminated or substantially reduced. The tread pieces obtained can be directly applied to the tire carcass on a building drum, or they can be laminated on a drum for use as a spun-on tread, or they can be stored for future use on tray trucks or rolled with liner separators and used instead of camelback for retreading purposes.

It will be understood, of course, that the words vertical and horizontal and lower and upper apply to the apparatus as shown in the drawings and bear references to the different sections across the tread, as shown. Should the apparatus be placed in a different operating position, equivalent and corresponding terminology would be implied.

I claim:

1. A method of extruding raw tire treads comprising: positioning a pair of tread dies having openings in the form of the tread cross-section on opposite sides of the head of an extruder, said openings being inverted relative to each other; partially blocking said openings so that only opposed dissimilar sections of said openings are unblocked; extruding a length of elastomeric tread stock material through said opposed sections; successively unblocking adjacent sections of said openings; correlating between said dies the blocking and unblocking of said openings; and extruding continuous lengths of said material through each of said sections, said lengths being substantially equal to each other and to the outer circumference of the tire carcass on which said lengths are to be wrapped and the combined cross-sections of said lengths having a contour substantially identical to said opening.

2. A method of extruding raw tire treads, comprising: positioning a pair of tread dies having openings in the form of the tread cross-section on opposite sides of the head of an extruder, said openings being inverted relative to each other; positioning a vertically movable gate adjacent each of said openings, said gates having slits therethrough smaller than said openings so that elastomeric tread stock material may be extruded through only a horizontal section of said opening for each vertical position of said gates; extruding lengths of material through horizontally opposed dissimilar sections of said openings at a first vertical position of said gates; simultaneously moving said gates to a plurality of positions to open different opposed sections of said openings; and extruding lengths of material through said openings at each position of said gates, all of said lengths being substantially equal to each other and to the outer circumference of the tire carcass on which said lengths are to be wrapped and the combined cross-sections of said lengths having a contour substantially identical to said openings.

3. A method according to claim 2 in which the said extruding of lengths of material is continuous while the gates are in movement.

4. An extruder, comprising: an extrusion head; a pair of dies having openings in the form of the desired cross-section, said dies being mounted on opposite sides of said extrusion head and said openings being inverted relative to one another; each die having gate means for partially blocking said openings associated with it, each of said gate means having an elongated slit therethrough smaller than said openings, the gate means placed in relationship to the dies such that material will be extruded only through those portions of the dies which are in proximity to the slits in the gate means; and means for moving said gate means so that lengths of elastomeric tread stock material may be extruded through different sections of said openings.

5. The apparatus according to claim 4 in which said dies are tread dies for use in tires.

6. The apparatus according to claim 4 in which the shapes of the openings in the dies and the movement of the gate means are such that the sum of the cross-sectional areas of the unblocked portions of the die openings remain approximately constant.

References Cited

UNITED STATES PATENTS

| 2,487,910 | 11/1949 | Waddell et al. | 18—12 |
| 3,003,245 | 10/1961 | Nunez | 18—12 |

FOREIGN PATENTS

| 115,076 | 4/1918 | Great Britain. |

ROBERT F. WHITE, *Primary Examiner.*

G. AUVILLE, *Assistant Examiner.*

U.S. Cl. X.R.

18—12; 264—177